United States Patent
Berger et al.

(10) Patent No.: US 10,989,122 B2
(45) Date of Patent: Apr. 27, 2021

(54) DUAL-FUEL FUEL INJECTION SYSTEM FOR AN INTERNAL COMBUSTION ENGINE

(71) Applicant: Woodward L'Orange GmbH, Stuttgart (DE)

(72) Inventors: Ingmar Berger, Stuttgart (DE); Hartmut Schneider, Altenried (DE)

(73) Assignee: Woodward L'Orange GmbH, Stuttgart (DE)

( * ) Notice: Subject to any disclaimer, the term of this patent is extended or adjusted under 35 U.S.C. 154(b) by 173 days.

(21) Appl. No.: 16/094,812

(22) PCT Filed: Apr. 21, 2017

(86) PCT No.: PCT/EP2017/025093
§ 371 (c)(1),
(2) Date: Oct. 18, 2018

(87) PCT Pub. No.: WO2017/182142
PCT Pub. Date: Oct. 26, 2017

(65) Prior Publication Data
US 2019/0120149 A1 Apr. 25, 2019

(30) Foreign Application Priority Data
Apr. 22, 2016 (DE) .......................... 102016107454.3

(51) Int. Cl.
*F02D 19/06* (2006.01)
*F02M 63/00* (2006.01)
(Continued)

(52) U.S. Cl.
CPC ..... *F02D 19/0684* (2013.01); *F02D 19/0673* (2013.01); *F02M 21/0245* (2013.01);
(Continued)

(58) Field of Classification Search
CPC ............ F02D 19/0684; F02D 19/0673; F02M 21/0245; F02M 43/00; F02M 43/02;
(Continued)

(56) References Cited

U.S. PATENT DOCUMENTS 5,890,459 A 4/1999 Hedrick et al.
9,926,861 B2 * 3/2018 Kalenborn ............. F02M 43/04
(Continued)

FOREIGN PATENT DOCUMENTS

DE 102013017853 A1 4/2015
DE 102014105439 A1 10/2015

OTHER PUBLICATIONS

PCT International Search Report and Written Opinion of the International Searching Authority, PCT/EP2017/025093, dated Aug. 21, 2017, 7 pages.
International Preliminary Report on Patentability in International Application No. PCT/EP2017/025093, dated Oct. 23, 2018, 10 pages with English Translation.
(Continued)

*Primary Examiner* — Hung Q Nguyen
(74) *Attorney, Agent, or Firm* — Fish & Richardson P.C.

(57) ABSTRACT

A dual-fuel fuel injection system for an internal combustion engine has a liquid fuel injection branch and a gas fuel injection branch, in which a gas injector assembly that is controllable via a control fluid is situated. The liquid fuel forms the control fluid of the gas injector assembly.

10 Claims, 2 Drawing Sheets

Figure 1:
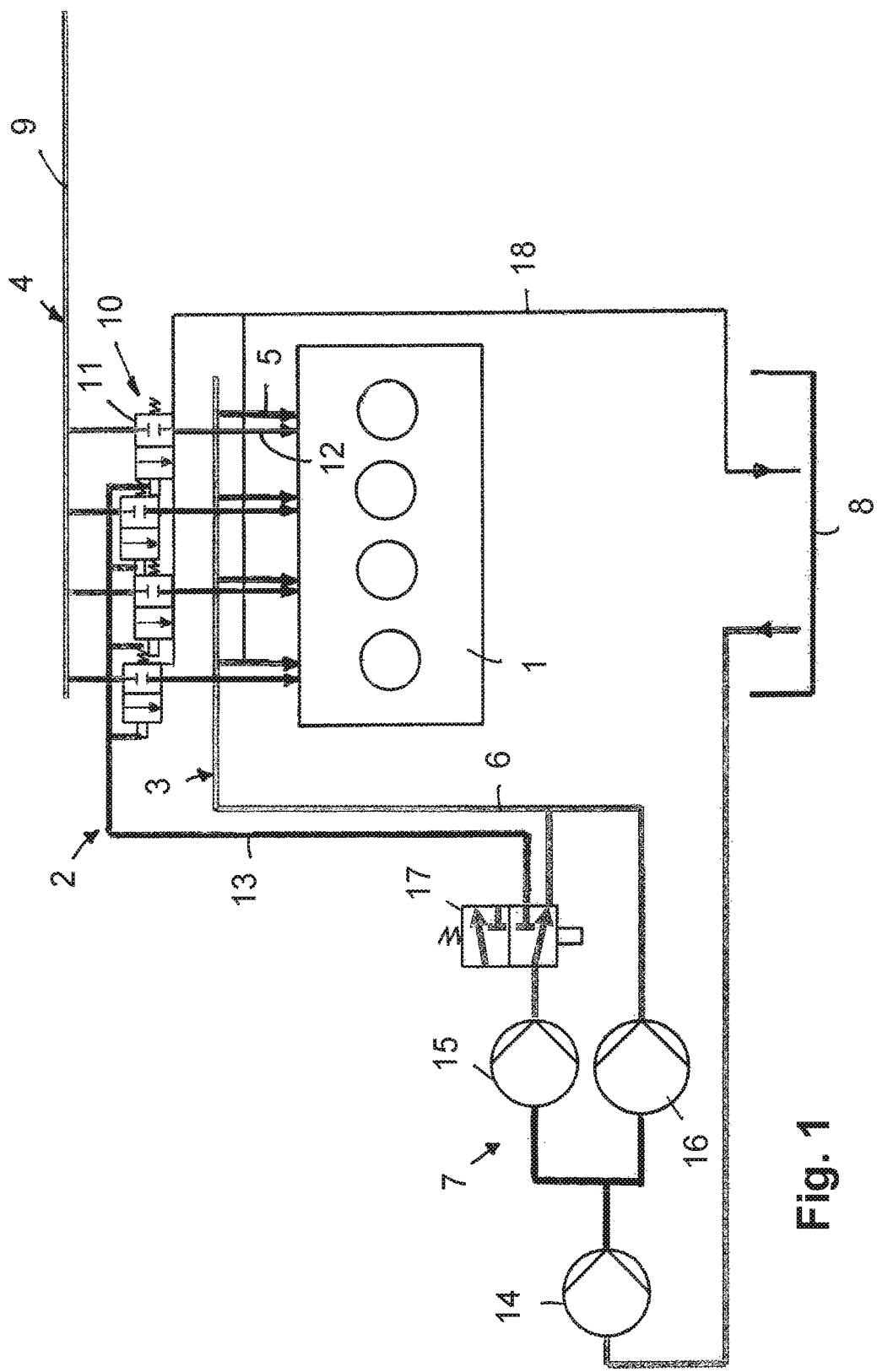

(51) Int. Cl.
  *F02M 43/04* (2006.01)
  *F02M 43/02* (2006.01)
  *F02M 21/02* (2006.01)
  *F02M 43/00* (2006.01)
  *F02M 37/00* (2006.01)
  *F02M 47/02* (2006.01)

(52) U.S. Cl.
  CPC ............ *F02M 43/00* (2013.01); *F02M 43/02* (2013.01); *F02M 43/04* (2013.01); *F02M 63/0028* (2013.01); *F02M 21/023* (2013.01); *F02M 21/0248* (2013.01); *F02M 37/0023* (2013.01); *F02M 47/02* (2013.01); *Y02T 10/30* (2013.01)

(58) Field of Classification Search
  CPC ............ F02M 63/0028; F02M 43/04; F02M 21/0248; F02M 21/023; F02M 37/0023; F02M 47/02; Y02T 10/36; Y02T 10/32
  See application file for complete search history.

(56) References Cited

U.S. PATENT DOCUMENTS

| | | | |
|---|---|---|---|
| 2009/0020631 A1 | 1/2009 | Makoto | |
| 2011/0023853 A1* | 2/2011 | Lund | F02D 19/0665 123/590 |
| 2012/0186560 A1* | 7/2012 | Lund | F02D 19/087 123/495 |
| 2013/0125867 A1* | 5/2013 | Krug | F02D 19/0689 123/575 |
| 2013/0319373 A1* | 12/2013 | Brown | F02M 21/026 123/456 |
| 2014/0311451 A1* | 10/2014 | Fang | F02M 21/0284 123/445 |

OTHER PUBLICATIONS

Chinese Office Action in Chinese Application No. 2017800155108, dated Jan. 6, 2020, 12 pages with English translation.

* cited by examiner

DUAL-FUEL FUEL INJECTION SYSTEM FOR AN INTERNAL COMBUSTION ENGINE

CROSS-REFERENCE TO RELATED APPLICATIONS

This application is a U.S. National Phase application under 35 U.S.C. § 371 and claims the benefit of priority to International Application Serial No. PCT/EP2017/025093, filed on Apr. 21, 2017, which claims priority to German Application No. 102016107454.3, filed on Apr. 22, 2016, the contents of which are hereby incorporated by reference.

The invention relates to a dual-fuel fuel injection system for an internal combustion engine according to the preamble of Claim 1.

An internal combustion engine having a dual-fuel fuel injection system is described in DE 10 2010 061 183 A1. The internal combustion engine is operated with liquid or gaseous fuel that is injected via fuel injectors of the dual-fuel fuel injection system, wherein larger injectors are provided for the injection of the liquid fuel in the liquid fuel operation, and smaller injectors are provided for a pilot injection of the liquid fuel in the gas operation. The liquid fuel is conveyed to the differently sized injectors via pumps that are correspondingly differently dimensioned.

A dual-fuel fuel injection system for internal combustion engines is also known from DE 10 2014 105 439 A1. The injection takes place via liquid fuel injectors and combustion gas injectors, the inflow of the fuel to the particular injectors being controllable via switching valves.

The object of the invention is to provide a dual-fuel fuel injection system having a simple structural design.

This object is achieved according to the invention via the features of Claim 1. The subclaims set forth advantageous refinements.

The dual-fuel fuel injection system according to the invention is utilized in or for internal combustion engines, and uses diesel fuel, heavy oil, or bio-oil, for example, as liquid fuel and uses combustion gas such as natural gas or biogas as gas fuel. The liquid fuel and the gas fuel are each supplied via an associated injection branch of the internal combustion engine in which an injector assembly for injection of the liquid or gaseous fuel is situated in each case. The gas injector assembly in the gas fuel injection branch is controllable via a control fluid which adjusts the gas injector assembly between an open position and a closed position. According to the invention, the liquid fuel forms the control fluid of the gas injector assembly.

This procedure has the advantage that an actuation circuit with additional hydraulic fluid for controlling the gas injector assembly is not necessary. Rather, it is sufficient to branch off a substream of the liquid fuel and use it as control fluid for controlling the gas injector assembly. Additional hydraulic fluid for controlling the gas injector assembly is not necessary, so that corresponding storage containers and lines may also be dispensed with.

In the embodiment according to the invention, a shared tank for holding the liquid fuel, which in liquid fuel operation is led to the associated liquid fuel injectors, and which in gas operation controls the gas injector assembly, is sufficient.

A pilot injection with the liquid fuel for igniting the gas mixture is advantageously carried out in the gas operation.

According to one advantageous embodiment, the dual-fuel fuel injection system includes a high-pressure pump via which the liquid fuel is conveyed to the gas injector assembly in the gas operation. The high-pressure pump may be part of a pump assembly that comprises multiple pumps connected in parallel and/or in series, by means of which the required pressure in the liquid fuel for injection in the liquid fuel operation as well as for controlling the gas injector assembly, optionally also for the pilot injection in the gas operation, is generated.

The pump assembly has, for example, two high-pressure pumps connected in parallel, of which a first high-pressure pump is used for conveying the liquid fuel to the gas injector assembly for controlling same, and the second high-pressure pump is used solely for conveying the liquid fuel to liquid fuel injectors. The first high-pressure pump may optionally also convey to the liquid fuel injectors during the liquid fuel operation, so that these injectors are supplied with the liquid fuel jointly with the second high-pressure pump. This embodiment has the advantage that both high-pressure pumps may have smaller dimensions than a single pump which must provide the high liquid fuel pressure for the liquid fuel operation.

As the result of providing two pumps, according to another advantageous embodiment these pumps may be dimensioned differently with regard to their pump output. In particular, the high-pressure pump that is used for controlling the gas injector assembly may have larger dimensions than the other high-pressure pump, which is used solely for conveying the liquid fuel to the liquid fuel injectors. For example, it may be advantageous for the larger high-pressure pump to provide at least 75%, optionally at least 90%, of the total pump output, and for the second high-pressure pump to correspondingly provide only 25% maximum or 10% maximum of the total pump output.

In another embodiment, the high-pressure pump that is used for controlling the gas injector assembly may have smaller dimensions than the other high-pressure pump, which is used solely for conveying the liquid fuel to the liquid fuel injectors.

It may be advantageous to connect a pre-feed pump upstream from the one or more high-pressure pumps, in particular in the embodiment with two high-pressure pumps connected in parallel. Furthermore, it is also possible to provide only one high-pressure pump, which has large enough dimensions to in particular generate the high pressure in the liquid fuel operation.

For the case of multiple high-pressure pumps, in particular two high-pressure pumps connected in parallel, these pumps may be situated in a shared pump housing, the outlets of the pumps optionally being regulated separately, for example via a suction throttle regulator in each case. The advantage of the shared pump housing for multiple pumps lies in the smaller installation space requirements.

According to yet another advantageous embodiment, a switching device that is adjustable between various switching positions is associated with the high-pressure pump, via which liquid fuel is selectively conveyable to the liquid fuel injectors or to the gas injector assembly. Depending on the switching position of the switching device, liquid fuel is conveyed to the liquid fuel injectors or to the gas injector assembly.

The switching device may either be integrated into the high-pressure pump, or provided separate from the high-pressure pump and situated outside the high-pressure pump. When the switching device is integrated into the high-pressure pump, the high-pressure pump has two outlets, for example, which may each be opened and closed and which allow liquid fuel to be selectively conveyed to the liquid fuel injectors or to the gas injector assembly.

According to yet another advantageous embodiment, a switching valve which forms the switching device is situated downstream from the high-pressure pump via which liquid fuel is selectively conveyable to the liquid fuel injectors or to the gas injector assembly, in order to either convey liquid fuel only to the liquid fuel injectors for the liquid fuel operation, or to convey liquid fuel in the gas operation, for controlling the gas injector assembly and also for pilot injection to the fuel injectors, depending on the type of operation. In this embodiment, the switching device is provided separate from the high-pressure pump.

According to another advantageous embodiment, the gas injector assembly is connected to a liquid fuel tank via a leak return line. The liquid fuel injectors may likewise be connected to the liquid fuel tank via a leak return line. Line sections from the gas injector assembly and from the liquid fuel injectors advantageously open into a shared leak return line.

The high-pressure pump or the high-pressure pumps may optionally be driven via electric motors, which allows the energy requirements to be minimized and also allows the pumps to be precisely controlled.

According to another advantageous embodiment, a pressure relief valve is situated in the control fluid line, leading from the pump assembly to the gas injector assembly, in order to protect the gas injector assembly from excessive pressure, in particular during a switchover operation between gas fuel operation and liquid fuel operation. The pressure relief valve may be connected to the liquid fuel tank or to the leak line via a connecting line.

Figure 2:
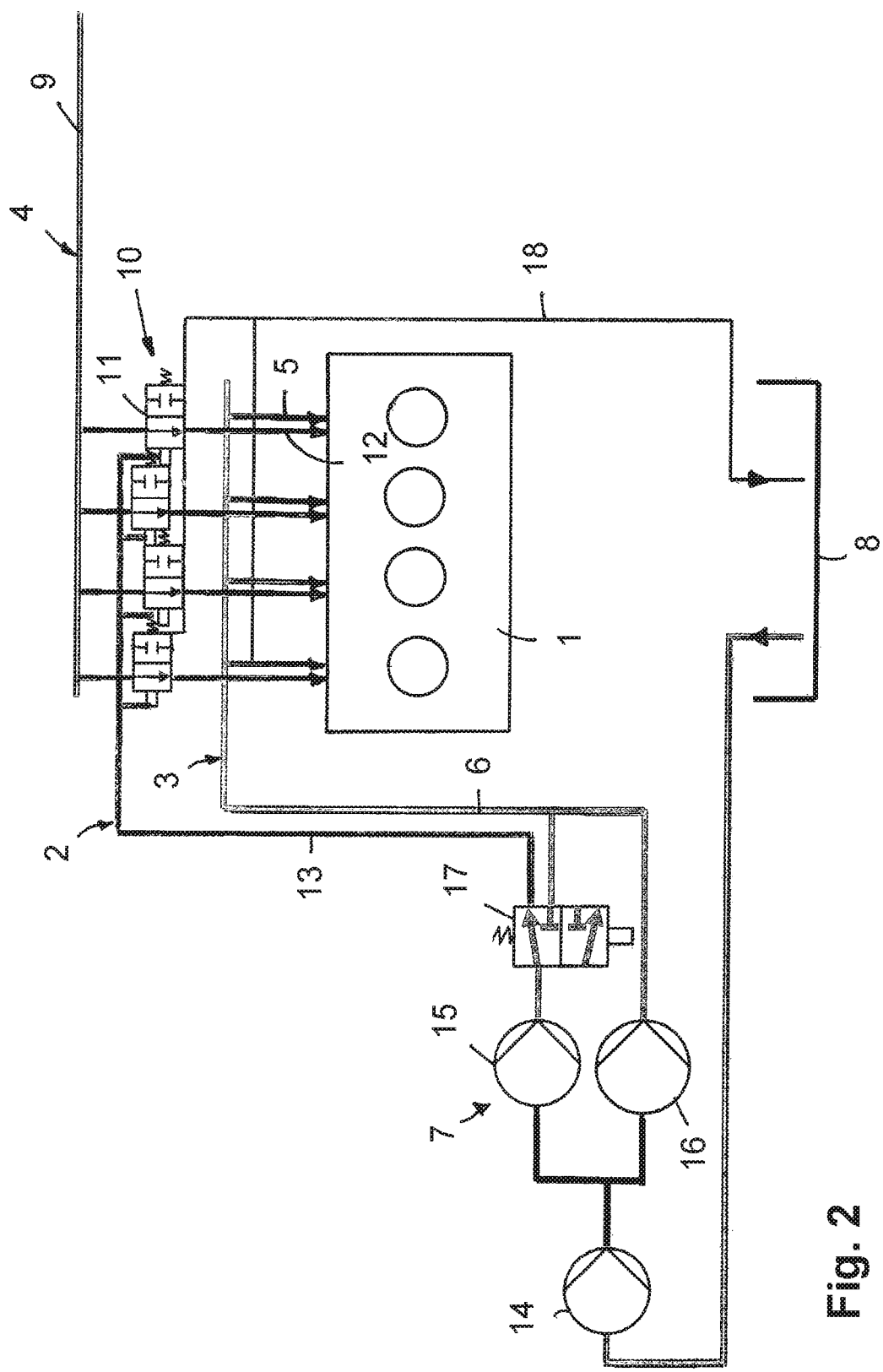

Further advantages and practical embodiments are set forth in the additional claims, the description of the figures, and the drawings, which show the following:

FIG. 1 shows a schematic illustration of an internal combustion engine having a dual-fuel fuel injection system, illustrated in liquid fuel operation, and FIG. 2 shows the internal combustion engine having a dual-fuel fuel injection system, illustrated in gas operation.

Identical components are provided with the same reference numerals in the figures.

FIGS. 1 and 2 illustrate an internal combustion engine 1 that is equipped with a dual-fuel fuel injection system 2 for alternative operation with liquid fuel and with combustion gas. The dual-fuel fuel injection system 2 includes a liquid fuel injection branch 3 via which the liquid fuel is supplied to the internal combustion engine 1, and a gas fuel injection branch 4 for supplying combustion gas to the internal combustion engine 1. Fuel injectors 5 are situated in the liquid fuel injection branch 3, and are connected to a liquid fuel tank 8 via a liquid fuel line 6 in which a pump assembly 7 is situated. The liquid fuel from the tank 8 is supplied at high pressure to the liquid fuel injectors 5 via the pump assembly 7 for injection into the cylinders of the internal combustion engine 1.

The gas fuel injection branch 4 includes a gas line 9 for supplying gas from a gas reservoir, and a gas injector assembly 10 for controlled injection of the combustion gas into the cylinders of the internal combustion engine. The gas injector assembly 10 includes control valves 11 and gas injectors 12, each associated with a control valve 11, with a gas needle via which the combustion gas is led into the cylinders of the internal combustion engine. The associated gas injectors 12 are adjusted between the open position and the closed position by means of the control valves 11.

The control valves 11 of the gas injector assembly 10 are controlled by a control fluid, which is the liquid fuel from the tank 8. The control valves 11 are connected to the pump assembly 7 and to the liquid fuel tank 8 via a line 13. The controlled injection of combustion gas into the internal combustion engine 1 takes place via the actuation of the control valves 11 in the gas operation, with the aid of the liquid fuel which functions as a control fluid.

The pump assembly 7 includes a pre-pump 14 and two high-pressure pumps 15 and 16, connected in parallel, which are connected to the pre-pump 14 in series downstream from same. The pump assembly 7 also includes a switching valve 17 downstream from the first high-pressure pump 15. With the aid of the switching valve 17, the first high-pressure pump 15 may be switched into flow connection with the liquid fuel line 6 (FIG. 1, liquid fuel operation) or into flow connection with the line 13 for controlling the control valves 11 (FIG. 2, gas operation). The second high-pressure pump 16 is situated in the liquid fuel line 6, via which liquid fuel is conveyed to the fuel injectors 5 during the liquid fuel operation and also during the gas operation.

The control valves 11 of the gas injector assembly 10 as well as the liquid fuel injectors 5 are connected to a leak return line 18 via which leakage fluid of the liquid fuel is returned to the tank 8.

In the liquid fuel operation illustrated in FIG. 1, the switching valve 17 is switched in such a way that the liquid fuel conveyed from the tank 8 by the first high-pressure pump 15 is led solely into the liquid fuel line 6 of the liquid fuel injection branch 3, and further to the liquid fuel injectors 5. The gas fuel injection branch 4 is not in operation.

Liquid fuel is conveyed into the line 6 and to the injectors 5 via the second high-pressure pump 16 in addition to the first high-pressure pump 15. The two high-pressure pumps 15 and 16 are dimensioned differently with regard to their pump output. The first high-pressure pump 15 has a higher pump output than the second high-pressure pump 16. In particular the maximum pressure of the liquid fuel of 2200 bar, for example, is settable via the simultaneous operation of the two high-pressure pumps 15 and 16. In contrast, only a lower pressure of the liquid fuel, for example 1500 bar maximum, is settable by operation solely of the second high-pressure pump 16.

It may be sufficient for only the first high-pressure pump 15 to be in operation in the liquid fuel operation according to FIG. 1.

The gas operation of the dual-fuel fuel injection system is illustrated in FIG. 2. In the gas operation, the switching valve 17 is switched in such a way that the fuel conveyed by the first high-pressure pump 15 is led into the line 13 to the gas injector assembly 10, and at that location switches the control valves 11 so that gas is led from the gas line 9 via the control valves 11 to the gas injectors 12, via which the injection into the cylinders of the internal combustion engine 1 takes place.

At the same time, fuel is led via the second high-pressure pump 16 into the liquid fuel line 6 and further to the liquid fuel injectors 5 in order to carry out a pilot injection for igniting the gas mixture. The pressure at which the liquid fuel is conveyed by the second high-pressure pump 16 is lower than the pressure of the liquid fuel in the liquid fuel operation according to FIG. 1.

Leak quantities that occur during actuation of the control valves 11 in the gas operation and that occur at the injectors 5 in the liquid fuel operation are returned to the fuel tank 8 via the leak return line 18.

The invention claimed is:

1. A dual-fuel fuel injection system for an internal combustion engine, comprising:
   a liquid fuel injection branch;
   a liquid injector, fluidically connected to the liquid fuel injection branch;
   a gas fuel injection branch;
   a gas injector, fluidically connected to the gas fuel injection branch and comprising a control valve fluidically connected to the liquid fuel injection branch, and controllable by a control fluid to control gas flow provided by the gas fuel injection branch, wherein the control fluid comprises liquid fuel provided by the liquid fuel injection branch;
   a first high-pressure pump configured for conveying the liquid fuel to the gas injector;
   a second high-pressure pump configured for conveying the liquid fuel to at least the liquid injector; and
   a switching device for selectively conveying the liquid fuel from the second high-pressure pump to the liquid injector or to the gas injector.

2. The dual-fuel fuel injection system of claim 1, wherein the first high-pressure pump is configured to convey the liquid fuel to the gas injector during a gas operation.

3. The dual-fuel fuel injection system of claim 1, wherein the second high-pressure pump comprises the switching device.

4. The dual-fuel fuel injection system of claim 1, further comprising a pre-feed pump that is fluidically connected upstream from the first high-pressure pump and the second high-pressure pump.

5. The dual-fuel fuel injection system of claim 4, wherein the first high-pressure pump and the second high-pressure pump are fluidically connected in parallel.

6. The dual-fuel fuel injection system of claim 4, wherein the first high-pressure pump is configured to selectively convey the liquid fuel to the liquid injector or to the gas injector.

7. The dual-fuel fuel injection system of claim 1, wherein the gas injector is fluidically connected to a liquid fuel tank by a leak return line.

8. An internal combustion engine comprising:
   a liquid fuel injection branch;
   a liquid injector, fluidically connected to the liquid fuel injection branch;
   a gas fuel injection branch;
   a gas injector in the gas fuel injection branch and comprising a control valve fluidically connected to the liquid fuel injection branch, that is controllable by a control fluid to control gas flow provided by the gas fuel injection branch, wherein the control fluid comprises liquid fuel provided by the liquid fuel injection branch;
   a first high-pressure pump configured for conveying the liquid fuel to the gas injector during a gas operation;
   a second high-pressure pump configured for conveying the liquid fuel to at least the liquid injector; and
   a switching device for selectively conveying the liquid fuel from the second high-pressure pump to the liquid injector or to the gas injector.

9. A method for operating a dual-fuel fuel injection system comprising:
   conveying, during a gas operation, a liquid fuel to a gas injector assembly of the dual-fuel fuel injection system for an internal combustion engine, the dual-fuel fuel injection system comprising:
      a liquid fuel injection branch;
      a liquid injector assembly, fluidically connected to the liquid fuel injection branch;
      a gas fuel injection branch;
      the gas injector comprising a control valve fluidically connected to the liquid fuel injection branch, wherein the gas injector is arranged in the gas fuel injection branch and the control valve is controllable by a control fluid to control gas flow provided by the gas fuel injection branch, wherein the control fluid comprises the liquid fuel provided by the liquid fuel injection branch;
      a first high-pressure pump configured for conveying the liquid fuel to the gas injector;
      a second high-pressure pump configured for conveying the liquid fuel to the liquid injector; and
      a switching device for selectively conveying the liquid fuel to the liquid injector or to the gas injector; and
   conveying, by a first high-pressure pump and during the gas operation, the liquid fuel to the liquid injector;
   conveying, by a second high-pressure pump and during the gas operation, the liquid fuel to the switching device
   selectively conveying, by the switching device, the liquid fuel from the second high-pressure pump to the liquid injector; and
   selectively conveying, by the switching device, the liquid fuel from the second high-pressure pump to the gas injector.

10. The method of claim 9, further comprising selectively conveying, by the first high-pressure pump, the liquid fuel to the liquid injector or to the gas injector.

* * * * *

UNITED STATES PATENT AND TRADEMARK OFFICE
CERTIFICATE OF CORRECTION

PATENT NO. : 10,989,122 B2  
APPLICATION NO. : 16/094812  
DATED : April 27, 2021  
INVENTOR(S) : Berger et al.

Page 1 of 1

It is certified that error appears in the above-identified patent and that said Letters Patent is hereby corrected as shown below:

In the Specification

In Column 1, Line 13, below "contents of which are hereby incorporated by reference." please insert -- DESCRIPTION --.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*